United States Patent

Karachevtcev et al.

Patent Number: 5,988,400
Date of Patent: Nov. 23, 1999

[54] POUROUS FLUOROCARBON MEMBRANE, METHOD FOR PRODUCING THEREOF AND CARTRIDGE FILTER BASED ON SAID MEMBRANE

[75] Inventors: Vyacheslav Grigorievich Karachevtcev; Vladimir Pavlovich Dubjaga; Natalia Vladimirovna Amelina; Aleksandr Valentinovich Tarasov, all of Vladimir, Russian Federation

[73] Assignee: Aktsionernoe Obschestvo "Polimersintez", Vladimir, Russian Federation

[21] Appl. No.: 08/860,065

[22] PCT Filed: May 29, 1996

[86] PCT No.: PCT/RU96/00138

§ 371 Date: Jun. 20, 1997

§ 102(e) Date: Jun. 20, 1997

[87] PCT Pub. No.: WO97/15381

PCT Pub. Date: May 1, 1997

[30] Foreign Application Priority Data

Oct. 23, 1995 [RU] Russian Federation ............. 95118061

[51] Int. Cl.[6] .......................... B01D 63/00; B01D 71/32; B01D 27/00

[52] U.S. Cl. ............... 210/483; 210/321.77; 210/321.86; 210/484; 210/488; 210/489; 210/490; 210/493.1; 210/493.2; 210/493.5; 210/496; 210/500.36; 210/500.42; 264/41; 264/136

[58] Field of Search ..................... 210/483, 484, 210/488, 489, 490, 493.1, 493.2, 321.77, 493.4, 321.86, 493.5, 498, 496, 500.36, 500.42; 264/41, 136, 241

[56] References Cited

U.S. PATENT DOCUMENTS

| | | |
|---|---|---|
| 4,384,047 | 5/1983 | Benzinger et al. . |
| 4,929,354 | 5/1990 | Meyering et al. . |
| 4,965,291 | 10/1990 | Kitoh et al. . |
| 4,990,294 | 2/1991 | Yen et al. . |
| 5,013,339 | 5/1991 | Mahoney et al. .................. 210/500.42 |
| 5,158,680 | 10/1992 | Kawai et al. ...................... 210/500.36 |
| 5,445,739 | 8/1995 | Fujimoto et al. .................. 210/500.36 |

FOREIGN PATENT DOCUMENTS 2632185 1/1977 Germany .

*Primary Examiner*—John Kim
*Attorney, Agent, or Firm*—Collard & Roe, P.C.

[57] ABSTRACT

A porous fluorocarbon membrane has a porous support completely impregnated with tetrafluoroethylene/vinylidene fluoride copolymer. There is a process for producing this membrane by impregnating a porous support with a copolymer solution in a readily-boiling solvent and a precipitating mixture of alcohol and water followed by curing for partial hardening of the solution and subsequent drying at elevated temperature. A cartridge filter includes protective and supporting cylindrical perforated hollow housings, containing a fluorocarbon membrane or two superimposed flourocarbon membranes. Membranes and a cartridge filter find extensive use in separation of gases and aggressive media.

18 Claims, 4 Drawing Sheets

POUROUS FLUOROCARBON MEMBRANE, METHOD FOR PRODUCING THEREOF AND CARTRIDGE FILTER BASED ON SAID MEMBRANE

FIELD OF THE INVENTION

The present invention relates to a porous fluorocarbon membrane, method for production thereof and design of cartridge filter based on a porous fluorocarbon membrane. These filters are widely used in fine filtration of chemically active media due to their resistance with respect to agressive media and organic solvents commonly in use. Fluorocarbon membranes and cartridge filters based on said membranes can be conveniently sterylized by thermal treatment since they offer the required thermal stability. At the same time, porous fluorocarbon membranes are inherently hydrophobic, which is a disadvantage in the process of filtration of water-containing aqueous media. However, numerous techniques, well-known in the art, can be used to render fluorocarbon membranes hydrophilic. Therefore, said disadvantage can be readily overcome.

PRIOR ART

Porous fluorocarbon membranes produced from the solution of tetrafluoroethylene/vinylidene fluoride copolymer using both "wet" and "dry" processes, are well-known to those skilled in the art. "Wet" process is most common. First step thereof includes preparation of a casting (working) solution, consisting of a fluorocarbon polymer, solvent and non-solvent for said polymer. The working solution is then cast on a dense surface, which is unable to absorb said solution. Normally glass, polyethylene terephthalate film, stainless steel drum, etc. are used as said surface. At this point, either one of two ways can be employed: cast solution can be allowed to evaporate (in air or other controlled environment), within a specified period of time varying from a few seconds to a few minutes, after which the solution (already partly hardened) may be immersed in a quench bath. Alternatively, membrane casting can be performed directly under the surface of the quench bath, thus completely eliminating the stage of partial evaporation and hardening of the solution. Both methods are used on commercial scale providing membranes principally characterized by low strength and performance (service life and the amount of impurities retained). The above disadvantages encountered in "wet" process for producing porous membrane can be eliminated by using porous support in "wet" process and in membrane design, respectively. In this case porous support acts as a surface coated by a casting solution of fluorocarbon polymer. At this point a new problem emerges, i.e. rate of "wet" casting of membrane on porous support is drastically reduced and reaches only 0.52–1.0 m/min.

In another well-known "dry" process for producing porous fluorocarbon membrane, based on casting solution of tetrafluoroethylene (TFE)/vinylidene fluoride (VF) copolymer, said solution is formed into membrane on dense surface followed by complete evaporation of liquid components of the casting solution and peeling the membrane sheet from said surface. Disadvantages of said process are similar to those encountered in "wet" process, wherein porous support is not used, i.e. low mechanical strength of membrane and relatively low performance thereof. "Dry" process for producing porous fluorocarbon membranes on porous support has not yet been disclosed in prior art.

Another common method for producing porous membranes is known as "thermal" method. This method has been developed for the production of porous membranes from fluorocarbon polymers which are hard to dissolve in the available solvents and at temperatures acceptable for commercial-scale production.

Representative of this genre is U.S. Pat. No. 4,990,294 issued to Yen e.a., which discloses the preparation of blend from fluorocarbon polymer and solvent melt followed by coating the casting surface with the resultant blend from the extruder. The solvent is then removed by lowering the temperature. Disadvantages of said method are as follows: high-temperature destruction of polymer in the course of preparing melt thereof, relatively low rate of porous membrane formation and low strength of said membrane.

An example of "wet" process for producing porous fluorocarbon membranes is-disclosed in U.S. Pat. No. 4,384,047. This patent discloses porous fluorocarbon membrane based on TFE/VF copolymer, which membrane is produced from casting solution on dense surface followed by partial evaporation and hardening of casting solution and placement of thus obtained membrane in liquid gelation (precipitating) medium.

Another example of "wet" process for producing porous fluorocarbon membrane based on TFE/VF copolymer is U.S. Pat. No. 4,965,291. In accordance with this patent copolymer casting solution is formed into membrane directly under the surface of liquid setting bath, thus eliminating the stage of partial evaporation and hardening of the solution.

An example of "dry" method for producing unsupported porous fluorocarbon membranes is German Patent application (DE. A. 2,632,185) based on a Japanese Patent application filed Jul. 17, 1975, issued to Mano, Hitoshi, e.a. This patent discloses a method for producing porous fluorocarbon membranes by dissolving TFE/VF copolymer; preparing casting solution, applying said solution onto dense plate, evaporating liquid components of said solution to form porous membrane and peeling said membrane from the plate.

Porous fluorocarbon membranes are widely used in filtration units designed in the form of a cartridge filter. As a rule, cartridge filter includes protective and supporting cylindrical perforated hollow housings, pleated porous membrane provided with prefiltration device and drainage placed between said housings and tightly connected to the cases of end caps, at least one of said caps is provided with a central drain duct. In most cases cartridge filters differ in design of porous membrane used therein.

U.S. Pat. No. 4,929,354 discloses the design of cartridge filter provided with membrane made of aliphatic polyamide. Said cartridge filter exhibits low performance.

DETAILED DESCRIPTION OF THE INVENTION

The object of the present invention is to provide porous fluorocarbon membrane and cartridge filter based on said membrane which enable to perform the process of filtration of chemically active media exhibiting the best process and economical characteristics. In particular, the object of the present invention is to provide commercially applicable economical high-efficient method for producing said fluorocarbon membrane.

The porous fluorocarbon membrane according to the present invention is comprised of:

porous support having the average pore size of 5.0 to 500.0-microns and difference by specific weight in any two points of a sample having various sizes of 7.0% max., which support is completely impregnated by a copolymer, soluble in organic solvent, wherein said copolymer comprises 23–25 wt. % of tetrafluoroethylene and 75–77 wt. % of vinylidene fluoride and is characterized by (which characteristic defines the molecular weight and strength of copolymer being used): ratio of viscosity of copolymer solution in acetone to acetone equal to 2.0–4.0 with the copolymer content in the solution in the amount of 0.01 g/cm$^3$.

It was disclosed that the performance of the porous fluorocarbon membrane could be improved to a considerable extent provided:

a) a membrane design includes porous support having preset characteristics, determining structure thereof: average porosity and difference by specific weight in one sample b) a membrane design includes support completely impregnated (coated) by TFE/VF copolymer in "dry" process for membrane production c) a membrane design includes porous support completely impregnated by fluorocarbon copolymer having specified composition, molecular weight and strength: TFE/VF ratio, viscosity ratios.

The design of porous fluorocarbon membrane of the present invention is characterized by improved strength and performance. Due to said characteristics, intrinsic to the initial membrane, design of cartridge filter according to the present invention also displays improved performance. In accordance with the present invention, along with employing TFE/VF copolymer, it is possible to use the blend of said copolymer with other fluorocarbon polymers in the amount of 15% wt. max., i.e. at least 85% by weight of said copolymer is used. The following fluorocarbon polymers may be used as an additive to the basic TFE/VF copolymer: polyvinylidene fluoride, vinylidene fluoride/trichloroethylene copolymer and hexafluoropropylene/vinylidene fluoride copolymer. Said additives contribute to the improvement in porous membrane performance.

Porous fluorocarbon membrane of the present invention is produced by "dry" method, which in accordance with the invention includes: dissolution of TFE/VF copolymer in organic readily-boiling solvent; mixing of the resultant copolymer solution with precipitating mixture to form casting solution, formation of the resulting casting solution into membrane on porous material, i.e. the support, having the average pore size of 5.0 to 500.0 microns and 7% max. difference by specific weight in any two points of a sample having various sizes. Said membrane formation is performed by complete impregnation of porous material, i.e. support, with heated casting solution of copolymer, consisting of 23–25% by weight tetrafluoroethylene and 75–77% by weight vinylidene fluoride and having the ratio of viscosity of solution in acetone to acetone equal to 2–4, with copolymer content in the solution in the amount of 0.01 g/cm$^3$, by short-term storage of membrane under formation in the conditions of free evaporation of the part of solvent for partial hardening of casting solution and subsequent drying of the resulting membrane in at least three successive drying zones, wherein temperature is maintained such that it increases from one zone to another.

In accordance with "dry" process of the present invention for producing porous fluorocarbon membrane based on porous support, ketones, e.g. methyl ketone and acetone, are preferably used as readily-boiling organic solvent for fluorocarbon polymer (mixture of fluorocarbon polymers). When using acetone, which is a preferred embodiment, it is taken in the amount of 60–70% by weight of the weight of casting solution, wherein concentration of fluorocarbon polymer itself is from 7 to 12% by weight.

According to the present invention alcohol/water mixture is used as a precipitating mixture. Ethanol, buthanol, propanol and isopropanol may also be used. However, isopropanol or propanol are preferably used in the amount of at least 14% by weight, practically from 14 to 17% by weight, based on casting solution weight. Deionized water is used as water in the amount of at least 5.0% by weight, practically from 5 to 10% by weight, based on casting solution weight. Water is preferably deionized to the point where metal and salt content is less than 2.0 g/m$^3$.

In accordance with the method of the present invention dissolution of fluorocarbon polymer, in particular, said tetrafluoroethylene/vinylidene fluoride copolymer, is performed at elevated temperature, preferably at 30° C.–50° C.

In accordance with the method of the present invention precipitating mixture is produced separately from fluorocarbon polymer solution by mixing deionized water and alcohol at the temperature ranging from 18° C. to 25° C., under the pressure of inert gas, preferably nitrogen, ranging from 2 to 2 kPa.

According to the method of the present invention further mixing of fluorocarbon polymer solution and precipitating mixture is performed at elevated temperature, preferably at 45° C.±5° C. It is important to note that when precipitating mixture is fed into reactor containing heated fluorocarbon polymer solution, in accordance with the invention, the temperature difference between fluorocarbon polymer solution and precipitating mixture should not exceed 3° C. Failure to observe said condition will make processing of the resulting casting solution into high-quality membrane more complicated.

Preferred embodiment of the complete impregnation of porous support with casting solution includes the employment of application and sizing rollers having different rotational speed. Said rollers are partly submerged into casting solution. During rotation said rollers pick up casting solution and convey it onto porous support moving at a constant speed ranging from 1.0 to 10.0 m/min. Porous support is in constant contact with application roller. For the purpose of this invention continuous band made of porous material, meeting above mentioned specifications, is used as porous support. Support is preferably porous web of non-woven polypropylene 0.011–0.016 mm thick, 12–14 inches wide (300–350 mm), having surface density of 50–70 g/m$^2$. In practice, any porous material meeting the above requirements may also be used. Porous polyethylene terephthalate (lavsan) web having surface density of 35–70 g/m$^2$ has proven its suitability.

Composition of casting solution used for producing fluorocarbon porous membrane in accordance with the method of the present invention is selected proceeding from the required porosity of membrane and equipment currently in use. In case of roller method for application and preparation of casting solution the composition of casting solution presented in Table 1 is preferred.

TABLE 1

| Pore size in membrane, microns | Suggested casting solution composition (% wt. based on 100% content) | | | |
|---|---|---|---|---|
| | Copolymer content | Acetone content | Water content | Isopropanol content |
| 0.1 | 10.5–11.5 | 67.7–65.3 | 6.5–8.2 | 15.3–15.0 |
| 0.2 | 9.5–10.5 | 68.8–64.9 | 6.5–8.6 | 15.2–16.0 |
| 0.45 | 8.5–9.5 | 68.1–67.8 | 7.0–8.0 | 16.4–14.7 |
| 0.65 | 7.5–8.5 | 69.1–68.1 | 7.0–8.2 | 16.4–15.2 |

In accordance with the present invention a casting solution is applied on a porous support based on 10–50 g of copolymer per 1 m² of porous support. The temperature of casting solution is maintained within the range of 25° C.–45° C.

After the application of casting solution onto porous support is complete, said support becomes completely impregnated with said solution and is subjected to a short-term storage in the conditions of free evaporation of a portion of solvent at 18° C.–25° C. within 0.5–1.0 min. Under said conditions partial hardening of the casting solution occurs and a porous membrane starts to form.

Membrane formation process is completed at the stage of drying, which in accordance with the present invention, is carried out at least in three successive drying zones. Various temperatures are maintained in said zones, which temperatures increase as the resulting membrane is transferred from zone to zone, absolute humidity in said zones is maintained at approximately similar level. Preferred temperature values in drying zones when using roller continuous method for producing membrane on moving web of porous support are as follows:

first zone—ranging from 45° C. to 55° C.
second zone—from 55° C. to 65° C.
third zone—from 90° C. to 100° C.

Drying results in porous fluorocarbon membrane exhibiting high strength and performance which makes it possible to use said membrane in a cartridge fitter therefore endowing said filter with a novel feature—exclusive reliability and long service life while maintaining high filterability.

Design of the cartridge filter in accordance with the present invention (FIG. 4) consists of protective (33) and supporting (34) perforated hollow housings, pleated porous membrane (35) equipped with prefiltration device (36) and drainage (37) placed between said housings and tightly connected to the cases of end caps (38), at least one of said caps is provided with a central drain duct. The cartridge filter of the present invention includes a membrane consisting of a porous support having average pore size in the range of 5.0–500.0 microns and 7% max. difference by specific weight in any two points of a sample having various sizes and which is completely impregnated with copolymer soluble in organic solvent, which copolymer contains 23–25% by weight tetrafluoroethylene and 75–77% by weight vinylidene fluoride and which copolymer has the ratio of viscosity of solution in acetone to acetone equal to 2.0–4.0, calculated with copolymer content in the solution in the amount of 0.01 g/cm³.

In accordance with the present invention said impregnation may be carried out by the mixture of said copolymer with other modifying fluorocarbon additives. Content of said additives must not exceed 15 weight percent of total amount of fluorocarbon polymer. Polyvinylidene fluoride, vinylidene fluoride/trifluorochlorethylene copolymer or hexafluoropropylene/vinylidene fluoride copolymer may be used as a modifying additive.

In order to improve performance of the cartridge filter, i.e. degree of cleaning, amount of impurities retained, reliability and durability, the design of said filter, according to the invention, includes two specified porous fluorocarbon membranes superimposed such that membrane which is closer to prefiltration device has pore size ranging from 0.25 to 0.65 microns and the second membrane has pore size in the range of 0.15–0.45 microns. Said superimposition of membranes, in accordance with the invention, may be performed by two ways: either by active membrane surfaces in the direction of prefiltration device, or by surfaces opposite to active membrane surfaces. In the latter case reliability of cartridge filter is improved.

BRIEF DESCRIPTION OF DRAWINGS

FIGS. 1–4: Symbols:
1—measuring tank for the solvent for fluorocarbon polymer (copolymer and mixtures thereof)
2—measuring tank for alcohol included into precipitating mixture
3—deionized water meter
4—reactor—mixer for preparation of precipitating mixture
5—reactor for preparation of the solution of fluorocarbon polymer (copolymer and mixtures thereof) and casting solution
6—gear pump
7, 8, 10, 11—valves
9—filter 12—deaerator
13—drying chamber
14—porous support
15—casting roll assembly
16—finished porous fluorocarbon membrane
17—take-up reel
18—stiffening rib
19—blade of mobile mixer
20—blade of internal fixed mixer
21—mobile mixer
22—drive shaft of fixed mixer
23—flange
24—internal fixed mixer
25—reactor cover
26—joint assembly of internal fixed mixer
27—application roller
28—tension rollers
29—casting solution bath
30—casting solution 31—sizing roller
32—doctor blade
33—protective perforated hollow housing
34—supporting perforated hollow housing
35—porous fluorocarbon pleated membrane
36—pleated prefiltration device
37—pleated drainage
38—end cap Preferred Embodiment of the Invention Design of a porous fluorocarbon membrane, a method for producing thereof and a cartridge filter based on said membrane have been tested on pilot scale. Embodiments presented herein were performed using a pilot plant operating in continuous mode. Lay-out of said plant is shown in FIG. 1.

Liquid components involved in the process, i.e. solvent (ketone), alcohol and deionized water are fed to the appropriate reactors from measuring tanks 1,2,3. Alcohol (propyl or isopropyl) and deionized water are fed to the reactor 4 for the preparation of precipitating mixture. The reactor 4 is equipped with a heating jacket. Preparation of precipitating mixture is effected by mixing alcohol and water at room temperature (within the range of 18° C.–25° C.), nitrogen pressure (from 2.0 to 3.0 kPa). Rotational speed of the mixer is approximately 48±2 rev/min. Mixing time is about 30±5 min.

Figure 2:
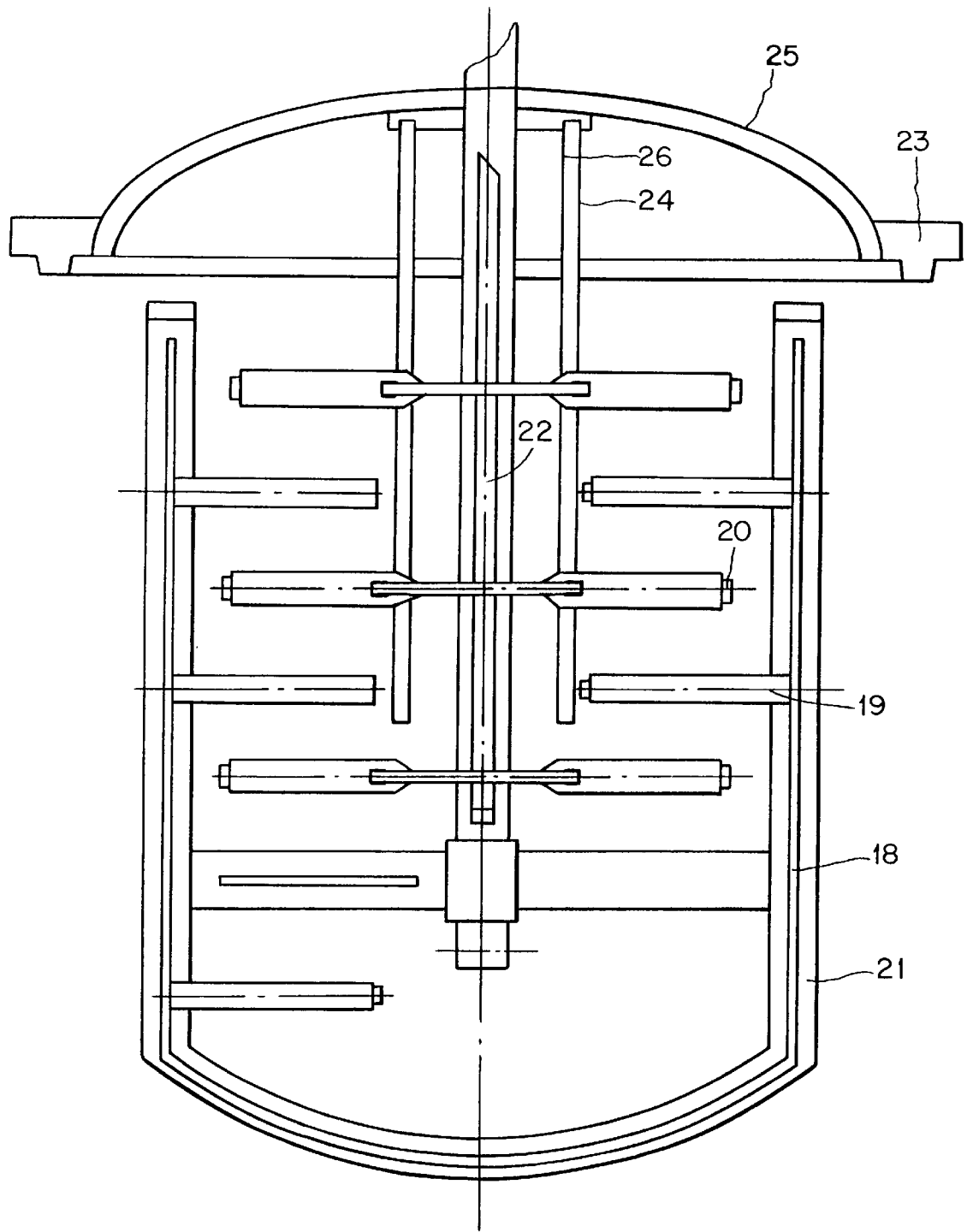

Copolymer solution (or mixture thereof with other fluorocarbon polymers) and casting solution are prepared in the reactor—mixer 5, having the capacity of 40.0 l, provided with a heating jacket and an anchor mixer, as shown in FIG. 2. First, approximately two-thirds of the designed amount of a solvent are delivered to the reactor 5 from the measuring tank 1. The mixer is then started and the designed amount of fluorocarbon is charged uniformly for approximately 25±5 min. On the completion of fluorocarbon polymer charging the remaining amount of solvent is fed from the measuring tank 1 to the reactor 5. After that heating of the heat carrier in the reactor 5 jacket is turned on and the content thereof is heated up to 45±5° C. Stirring is continued for 1 hour. Then heating of circuit pipes connecting the equipment 4–5,5–9, 9–12, 12–15 is started. Valve 7 is opened (while valves 8,10 and 11 remain closed) and the gear pump 6 is put into operation. Stirring of the reactor 5 content is continued for about 3.0 hours while the mixer and the circuit are running. Thus, total time required for fluorocarbon dissolution is about 4.0 hours.

Approximately 1.0 hour prior to the completion of fluorocarbon polymer dissolution heating of the heat carrier in the reactor—mixer 4 jacket is started and precipitating mixture, contained in the reactor 4, is heated up to 45±5° C. while the mixer is running.

On the completion of fluorocarbon polymer dissolution the precipitating mixture from the reactor 4 is fed to the reactor 5 uniformly for about 1.5+0.25 h. Stirring is then continued at 45±5° C. Total time required for the delivery of precipitating mixture and dissolution of fluorocarbon polymer ranges from 4 to 6.0 hours.

It should be noted that when feeding the precipitating mixture to the reactor 5, already containing the solution of fluorocarbon polymer, temperature difference between fluorocarbon polymer solution and precipitating mixture must not exceed 3° C.; otherwise quality of the resulting membrane is deteriorated. Delivery of the precipitating mixture to the reactor 5 is performed under continuous stirring and circulation of the resulting casting solution by means of pump 6.

The resulting casting solution is a system thermodynamically unstable at room temperature. Storage life of the finished casting solution at 45±5° C. under nitrogen pressure ranging from 2.0 to 3.0 kPa in a tightly sealed container is about 5 days.

Prior to the casting solution delivery to casting roll assembly (pos. 15, FIG. 1), filtration and deaeration thereof are preferred. Filtration of the casting solution is effected by means of the filter 9 and the circuit involving valves 7,8,10 and 11. Preferable fineness of filtration is about 1.0 micron.

Deaeration of the casting solution is performed for at least 4.0 hours at 40±5° C. by sedimentation in the deaerator 12.

Figure 3:
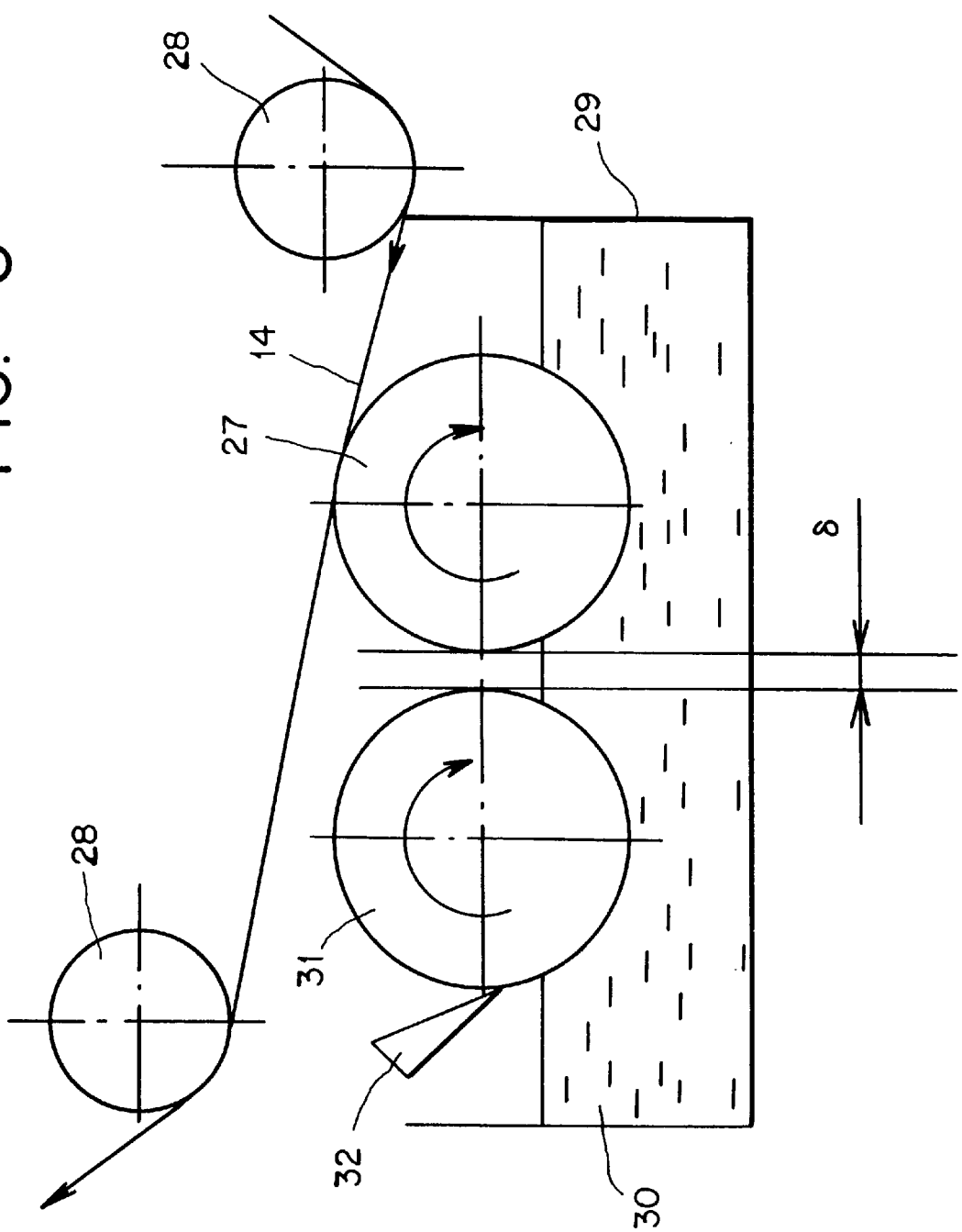
Figure 4:
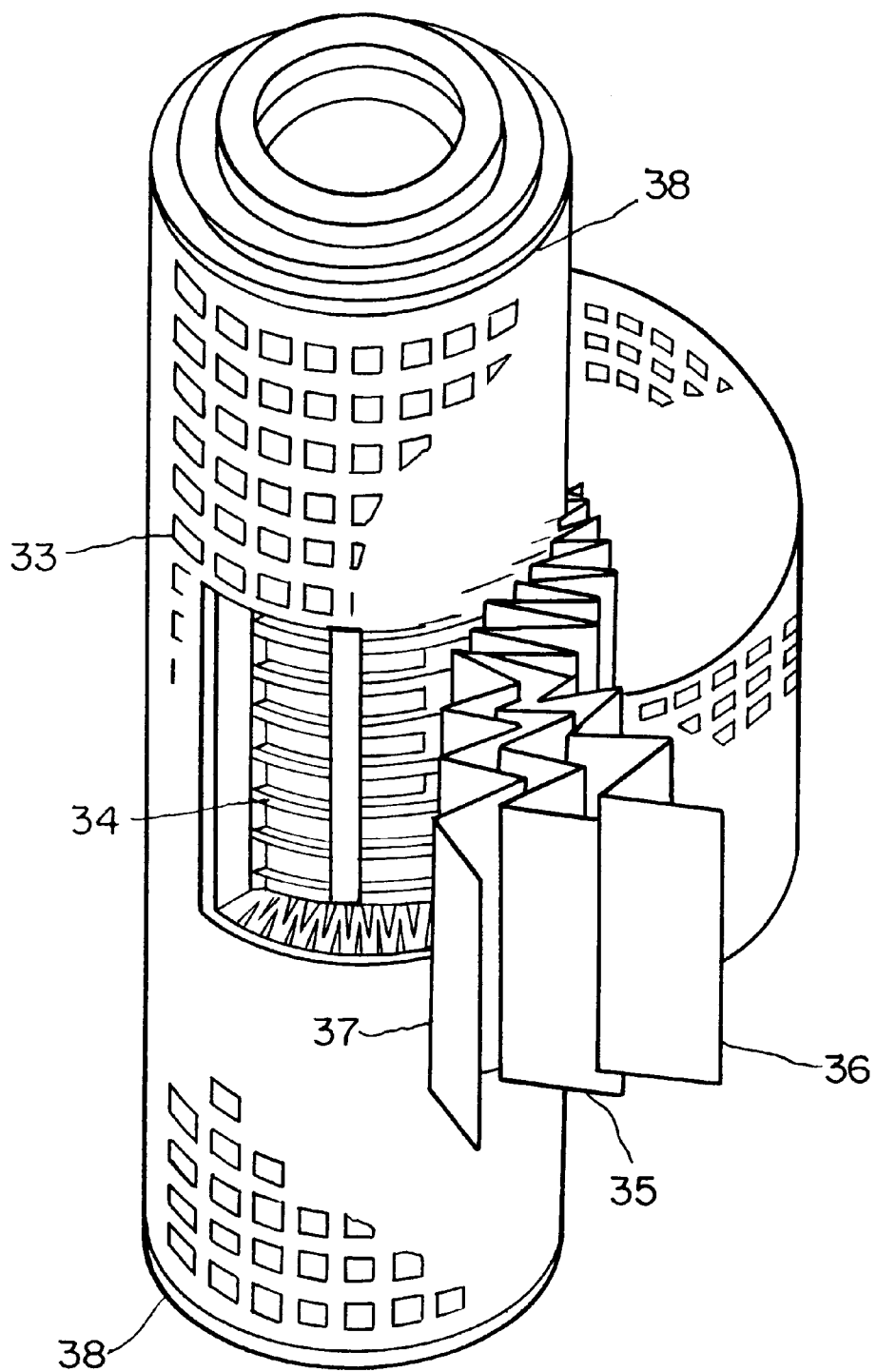

Filtered and deaerated casting solution is then fed to the casting roll assembly 15, as shown in FIG. 3.

The casting solution of fluorocarbon polymer is applied onto the continuously moving porous support by means of the rotative application roller 27 and the rotative sizing roller 31 partly submerged into the casting solution bath 29. In the course of the casting solution application the support 14 is transported at constant speed, ranging from 1.0 to 10.0 m/min, over the application roller 27, which roller is in close contact with said support. It is necessary that an even layer of the casting solution in the amount of from 10 to 50 g of fluorocarbon polymer per 1 m$^2$ of porous support is applied on said support.

The thickness of the applicable layer of the casting solution is controlled by the distance (clearance —δ—) fixed between the application roller 27 and the sizing roller 31. Doctor blade 32, which blades are tightly pressed against the surface of the sizing roller 31, contributes to more precise application of the required amount of casting solution onto the support. Clearance —δ— ranging from 700 to 1200 microns is preferable. However, the precise value thereof is determined in each specific case with respect to the equipment in use.

The ratio of linear rotational speeds of the application roller 27 and the sizing roller 31 as well as the speed of porous support 14 movement effect the thickness of the applied layer of the casting solution. Linear rotational speed of the application roller 27 (diameter thereof is in the range of 100–120 mm) must be 2.0 to 10.0 m/min. Linear rotational speed of the sizing roller 31 (diameter thereof is in the range of 100–120 mm) must be 1.0 to 5.0 m/min. The support transporting speed ranges from 1.0 to 10.0 m/min.

Temperature of the casting solution in the bath 29, in the course of application onto porous support, is maintained at 25° C.–45° C.

Figure 1:
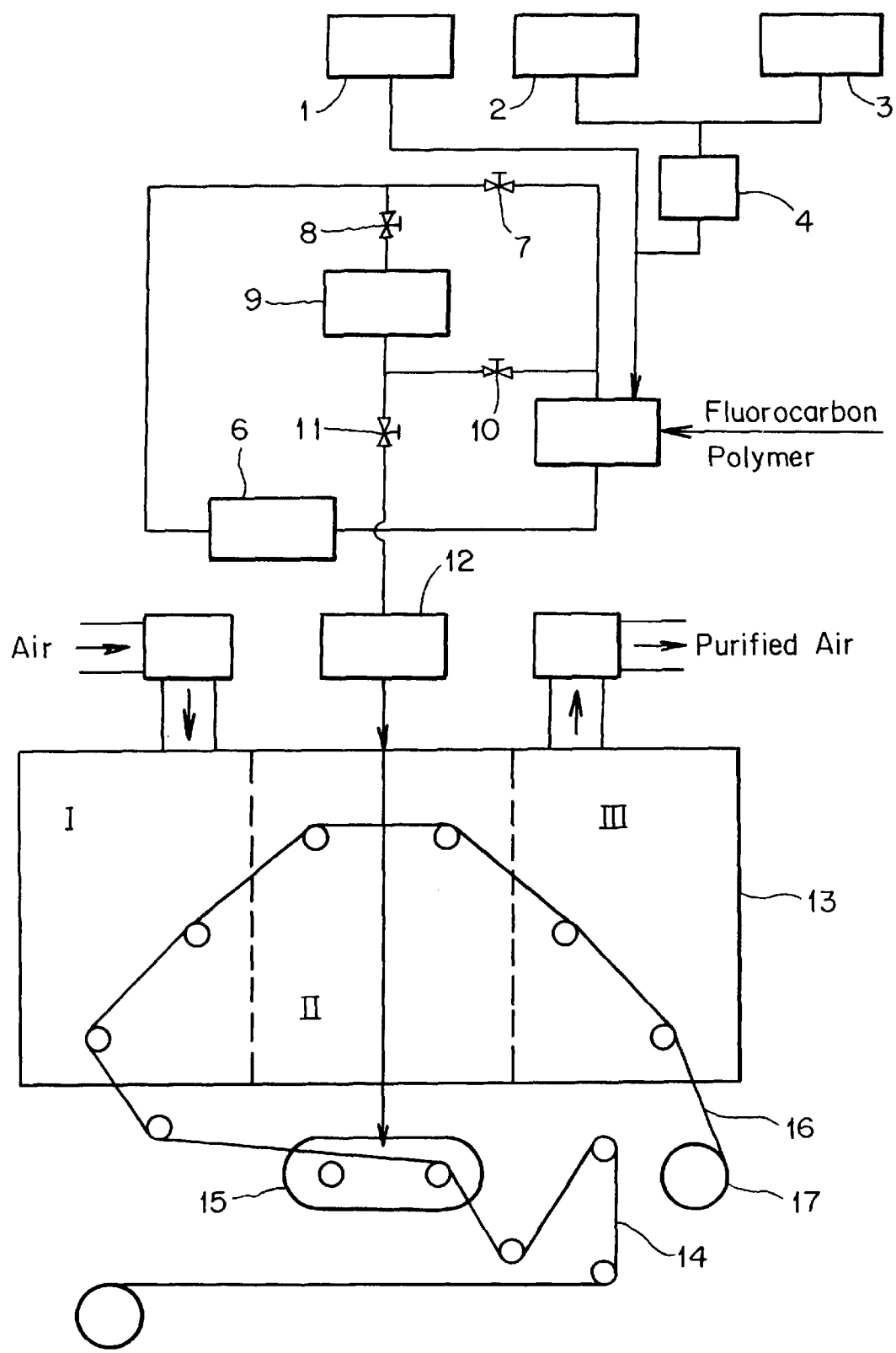
FIG. 1—illustrates the stages of the experimental continuous method for producing fluorocarbon porous membrane in accordance with the process of the invention FIG. 2—illustrates an anchor mixer used for casting solution preparation in the Examples of experimental production of membrane of the present invention FIG. 3—illustrates lay-out of basic equipment used for the application of casting solution onto porous support in the Examples using the experimental continuous method for producing membrane of the present invention FIG. 4—general view of the cartridge filter containing membrane of the present invention

Continuously moving support 14, coated with the casting solution, is then transferred to the arch-type three-zone drying chamber (pos. 13, FIG. 1). While continuously transferring the support, coating thereof is subjected to short-term storage at the temperatures ranging from 18° C. to 25° C. for about 0.5–1.0 min. Within this time partial hardening of the casting solution occurs and a porous membrane starts to form. The resulting continuously moving membrane is then transferred to the drier 13, provided with three drying sections (zones) wherein temperatures and humidity are maintained within the following ranges:

first zone—from 45° C. to 55° C.
second zone—from 55° C. to 65° C.
third zone—from 90° C. to 100° C.

Approximately same absolute humidity equal to 5.0 g/m$^3$ max. is maintained in all three zones.

In accordance with the present invention the most mild conditions for the removal (evaporation) of liquid components of the casting solution are maintained in the first zone, which contributes to the formation of polymer gel characterized by the required intensity. Properties of said gel produce strong effect on the formation of the porous membrane structure. The second zone is the zone of the resultant gel syneresis and formation of the porous membrane structure. In the third zone (FIG. 1), residual liquid components are finally removed from the casting solution and a porous structure of membrane is fixed.

Table 2 summarizes approximate process parameters of air supplied to the zones of the drying chamber 13. However, it should be noted that optimum values are to be selected depending on the specific type of equipment in use.

TABLE 2

Characteristics of air per zones in the drying chamber

| Zone, No. | Air flow, m³/h | Air temperature, ° C. | Absolute humidity, g/m³ |
|---|---|---|---|
| 1 | 2000 ± 100 | 50 ± 5 | 5.0 max. |
| 11 | 2000 ± 100 | 60 ± 5 | 5.0 max. |
| 111 | 4000 ± 200 | 95 ± 5 | 5.0 max. |

After leaving the drying chamber 13 the resultant porous membrane is wound on the reel 17.

Table 3 illustrates specific embodiments for producing a porous fluorocarbon membrane of the present invention, characteristics thereof and characteristics of a cartridge filter based on said membrane and produced in accordance with the invention.

While there have been described various embodiments of the present invention, considered to be preferred embodiments at present, it will be obvious to those skilled in the art that various changes and modifications may be made therein without departing from the invention and it is, therefore, aimed to cover all such changes and modifications as fall within the true spirit and scope of the invention.

Industrial Applicability

The present invention may be used in order to update current or create novel commercial processes for producing porous fluorocarbon membranes and cartridge filters based on said membranes.

Updating can enable the implementation of the commercial, totally "dry" method for producing porous supported fluorocarbon membranes. Membranes of this type offer high and stable performance which contributes to the production of high-quality and reliable cartridge filters.

TABLE 3

Embodiments of the present invention on pilot scale

| | copolymer composition, % by weight | | | composition of casting solution, % by weight | | | | Temperature of copolymer dissolution |
|---|---|---|---|---|---|---|---|---|
| No. | TFE | VF | viscosity ratio | copolymer | ketone | water | alcohol | ° C. |
| 1 | 25 | 75 | 2.9 | 10 | 68.25 acetone | 6.52 | 15.23 i-propanol | 45 |
| 2 | 23 | 77 | 2.8 | 10 | | | | 45 |
| 3 | 23 | 77 | 3.1 | 10 | 68.25 m-e-ketone | -.- | 15.23 propanol | 45 |
| 4 | 23 | 77 | 2.8 | 11.5 | 60 acetone | 8.55 | 19.95 i-propanol | 45 |
| 5 | 23 | 77 | 2.8 | 9.5 | 69 acetone | 7.5 | 14.0 i-propanol | 45 |
| 6 | 23 | 77 | 2.8 | 10.5 | 69.5 acetone | 5.0 | 15.0 i-propanol | 45 |
| 7 | 23 | 77 | 2.8 | 10.0 | 68.25 acetone | 6.52 | 15.23 i-propanol | 40 |
| 8 | 23 | 77 | 2.8 | | | | | 50 |
| 9 | 23 | 77 | 2.8 | | | | | 45 |
| 10 | 23 | 77 | 2.8 | | | | | 45 |
| 11 | 23 | 77 | 2.8 | | | | | 45 |
| 12 | 23 | 77 | 2.8 | | | | | 45 |
| 13 | 23 | 77 | 2.8 | | | | | 45 |
| 14 | 23 | 77 | 2.8 | | | | | 45 |
| 15 | 23 | 77 | 2.8 | | | | | 45 |
| 16 | 23 | 77 | 2.8 | | | | | 45 |
| 17 | 23 | 77 | 2.8 | | | | | 45 |
| 18 | 23 | 77 | 2.8 | | | | | 45 |
| 19 | 23 | 77 | 2.8 | 11.5 | 63.5 | 8.2 | 15.0 | 45 |
| 20 | 23 | 77 | 2.8 | 7.5 | 69.1 | 7.0 | 16.4 | 45 |

Notes: TFE - tetrafluoroethylene: VF - vinylidene fluoride; m-e-ketone - methyl ethyl ketone

| | conditions for casting | | conditions for application of casting solution onto support** | | | conditions for 3-stage drying ° C. per zones | | | humidity, |
|---|---|---|---|---|---|---|---|---|---|
| | solution preparation, ° C. | | speed, | consumption | solution | | | | |
| No. | solution | precipitator | m/min | rate, g/m² | temperature, ° C. | I | II | III | g/cm³ |
| 1 | 45 | 45 | 3 | 30 | 40 | 50 | 60 | 90 | 4 |
| 2 | 45 | 45 | 3 | 30 | 40 | 50 | 60 | 90 | 4 |
| 3 | 45 | 45 | 3 | 30 | 40 | 50 | 60 | 90 | 4 |
| 4 | 45 | 45 | 3 | 30 | 40 | 50 | 60 | 90 | 4 |
| 5 | 45 | 45 | 3 | 30 | 40 | 50 | 60 | 90 | 4 |
| 6 | 45 | 45 | 3 | 30 | 40 | 50 | 60 | 90 | 4 |
| 7 | 40 | 40 | 3 | 30 | 40 | 50 | 60 | 90 | 4 |
| 8 | 50 | 50 | 3 | 30 | 40 | 50 | 60 | 90 | 4 |

TABLE 3-continued

Embodiments of the present invention on pilot scale

| 9  | 45 | 42 | 3  | 30 | 40 | 50 | 60 | 90T | 4 |
| 10 | 45 | 45 | 10 | 30 | 40 | 50 | 60 | 90  | 4 |
| 11 | 45 | 45 | 4  | 30 | 40 | 50 | 60 | 90  | 4 |
| 12 | 45 | 45 | 3  | 10 | 40 | 50 | 60 | 90  | 4 |
| 13 | 45 | 45 | 3  | 50 | 40 | 50 | 60 | 90  | 4 |
| 14 | 45 | 45 | 3  | 30 | 35 | 50 | 60 | 90  | 4 |
| 15 | 45 | 45 | 3  | 30 | 45 | 50 | 60 | 90  | 4 |
| 16 | 45 | 45 | 3  | 30 | 40 | 45 | 55 | 90  | 4 |
| 17 | 45 | 45 | 3  | 30 | 40 | 55 | 65 | 100 | 4 |
| 18 | 45 | 45 | 3  | 30 | 40 | 50 | 60 | 90  | 5 |
| 19 | 45 | 45 | 3  | 30 | 40 | 50 | 60 | 90  | 4 |
| 20 | 45 | 45 | 3  | 30 | 40 | 50 | 60 | 90  | 4 |

Notes:
** "speed" means "speed of support": "consumption rate" means "consumption of copolymer": "solution temperature" means "temperature of casting solution at the point of application thereof onto moving support"

| No. | porous support material | membrane characteristics | | characteristics of cartridge filter having effective, surface of 0.4 m$^2$ | | |
| | | bubble point, atm | ethanol flux, l/m$^2$h | pore size microns | bubble point, atm | ethanol flux, l/m$^2$h |
| --- | --- | --- | --- | --- | --- | --- |
| 1  | porous. polypropylene (60/7)*** | 1.5 | 3000  |      | not defined |      |
| 2  | porous polypropylene (70/7)     | 1.4 | 4000  |      |             |      |
| 3  | lavsan                          | 1.3 | 3000  |      |             |      |
| 4  | porous polypropylene (70/7)     | 1.7 | 1300  |      |             |      |
| 5  | porous polypropylene (70/7)     | 0.8 | 11000 | 0.45 | 0.65        | 3100 |
| 6  | porous polypropylene (70/7)     | 2.7 | 1800  |      | not defined |      |
| 7  | porous polypropylene (70/7)     | 1.4 | 4000  |      |             |      |
| 8  | porous polypropylene (70/7)     | 1.4 | 4000  |      |             |      |
| 9  | porous polypropylene (70/7)     | 1.4 | 4000  |      |             |      |
| 10 | porous polypropylene (70/7)     | 0.8 | 10000 | 0.20 | 0.95        | 1050 |
| 11 | porous polypropylene (70/7)     | 1.3 | 4000  |      |             |      |
| 12 | porous polypropylene (70/7)     | 0.3 | 14000 |      | not defined |      |
| 13 | porous polypropylene (70/7)     | 2.0 | 1700  | 0.15 | 1.55        | 510  |
| 14 | porous polypropylene (70/7)     | 1.4 | 4000  |      | not defined |      |
| 15 | porous polypropylene (70/7)     | 1.4 | 4000  |      |             |      |
| 16 | porous polypropylene (70/7)     | 1.4 | 4000  |      |             |      |
| 17 | porous polypropylene (70/7)     | 1.4 | 4000  |      |             |      |
| 18 | porous polypropylene (70/7)     | 1.4 | 4000  |      |             |      |
| 19 | porous polypropylene (70/7)     | 2.5 | 1000  | 0.10 | 1.95        | 330  |
| 20 | porous polypropylene (70/7)     | 0.2 | 75000 |      | not defined |      |

Notes:
***Values in brackets specify pore size of porous material (in microns) and difference by specific weight in any two points of a sample having various sizes of porous material (in %)

What is claimed is:

1. A porous fluorocarbon membrane comprising
a porous support and a layer of fluorocarbon polymer connected to said porous support, said porous support having an average pore size ranging from 5.0 to 500.0 microns and difference by specific weight in any two points of a sample having various sizes of not more than 7%;
said porous support is completely impregnated with a copolymer solution soluble in organic solvent wherein the copolymer is consisting of 23–25 weight percent tetrafluoroethylene and 75–77 weight percent vinylidene fluoride,
the ratio of viscosity of the copolymer solution in acetone, with copolymer content in the solution in the amount of 0.01 g/cm$^3$, to acetone equal to 2.0–4.0.

2. A porous fluorocarbon membrane of claim 1,
wherein said membrane contains, as fluorocarbon polymer, the mixture of polymers comprised of at least 85.0 weight percent tetrafluoroethylene/vinylidene fluoride copolymer and fluorocarbon polymer selected from the group consisting of polyvinylidene fluoride, vinylidene fluoride/trifluorochloroethylene copolymer and hexafluoropropylene/vinylidene fluoride copolymer.

3. A method for producing a porous fluorocarbon membrane by dissolving tetrafluoroethylene/vinylidene fluoride copolymer in an organic readily-boiling solvent, mixing the resultant copolymer solution with a precipitating mixture to produce a casting solution, forming said casting solution into a membrane on a continuously moving carrying surface and drying the resulting continuously moving membrane at elevated temperature, wherein porous material having the average pore size within the range of 5.0–500.0 microns and difference by specific weight in any two points of a sample having various sizes of not more than 7% is used as a carrying surface; formation is performed by the complete impregnation of porous material moving at a constant speed with heated casting solution of a copolymer comprising 23–25 tetrafluoroethylene and 75–77 weight percent vinylidene fluoride and having the ratio of viscosity of the copolymer solution in acetone, with copolymer content in the solution in the amount of 0.01 g/cm$^3$, to acetone equal to 2.0–4.0; short-term storage of continuously moving porous material while applying the casting solution under the conditions of free evaporation of a portion of solvent for partial hardening of the casting solution and consequent drying of continuously moving porous material is effected in at least three successive drying zones wherein temperature, increasing from one zone to another, is maintained.

4. A method of claim 3, comprising using a ketone as a solvent for tetrafluoroethylene/vinylidene fluoride copolymer.

5. A method of claim 4, comprising using acetone as ketone in the amount of 60–70 weight percent of said casting solution comprising from 7.0 to 12.0 weight percent of tetrafluoroethylene/vinylidene fluoride copolymer or mixture thereof with other fluorocarbon polymers.

6. A method of claim 3, comprising using a mixture of alcohol and deionized water as a precipitating mixture.

7. A method of claim 3, wherein the alcohol is propyl alcohol or isopropyl alcohol in the amount of at least 14.0 weight percent of said casting solution containing at least 5.0 weight percent of deionized water.

8. A method of claim 3, comprising effecting dissolution of tetrafluoroethylene/vinylidene fluoride copolymer at the temperatures ranging from 30° C. to 50° C.

9. A method of claim 3, comprising, in the course of mixing a copolymer solution with a precipitating mixture maintaining a difference in temperatures thereof at 3° C. max.

10. A method of claim 3, comprising carrying out impregnation of porous material with said casting solution by means of the application and sizing rollers rotating at various speed and partly submerged into said casting solution, and applying said solution onto the porous support moving at a constant speed within the range of 1.0–10.0 m/min.

11. A method of claim 3, comprising applying a casting solution onto said porous support in the amount of 10.0–50.0 g of copolymer per 1 m$^2$ of said support.

12. A method of claim 3, comprising maintaining temperature of a casting solution applied onto said porous support within the range of 25° C.–45° C.

13. A method of claim 3, comprising performing short-storage for partial hardening of casting solution at 18° C.–25° C. for about 0.5–1.0 min.

14. A method of claim 3, comprising maintaining temperatures within the drying zones within the following ranges:

first zone—ranging from 45° C. to 55° C.

second zone—from 55° C. to 65° C.

third zone—from 90° C. to 100° C.

and absolute humidity in each drying zone is maintained at the level of not more than 5.0 g/m$^3$.

15. A cartridge filter comprising protective and supporting cylindrical perforated hollow housings, a pleated porous membrane provided with a prefiltration device and a drainage placed between said housings and tightly connected to the cases of end caps, at least one said end caps having a central drain duct, said cartridge filter further comprises a membrane consisting of a porous support having an average pore size within the range of 5.0–500.0 microns and the difference by specific weight in any two points of a sample having various sizes of 7.0% max., which porous support is completely impregnated with a copolymer solution soluble in organic solvent wherein the copolymer solution containing 23–25% by weight tetrafluoroethylene and 75–77% by weight vinylidene fluoride and having the ratio of viscosity of the solution thereof in acetone, with copolymer content in solution in the amount of 0.01 g/cm$^3$ to acetone equal to 2.0 to 4.0.

16. A cartridge filter of claim 15, wherein said filter comprises two porous fluorocarbon membranes superimposed so that the one closer to the prefiltration device has the pore size ranging from 0.25 to 0.65 microns and second membrane has the pore size ranging from 0.15 to 0.45 microns.

17. A cartridge filter of claim 16, wherein said filter comprises two porous membranes superimposed so that active surfaces of said membranes are directed towards the prefiltration device.

18. A cartridge filter of claim 16, wherein said filter comprises two porous membranes superimposed so that surfaces of said membranes are opposite to active surfaces.

* * * * *